(12) United States Patent
Girardin

(10) Patent No.: US 6,872,037 B2
(45) Date of Patent: Mar. 29, 2005

(54) LOW PROFILE SEAT BELT RETRACTOR SYSTEM

(75) Inventor: Jean Marc Girardin, North Miami Beach, FL (US)

(73) Assignee: Valeda Company LLC, Ft. Lauderdale, FL (US)

( * ) Notice: Subject to any disclaimer, the term of this patent is extended or adjusted under 35 U.S.C. 154(b) by 180 days.

(21) Appl. No.: 10/321,678

(22) Filed: Dec. 18, 2002

(65) Prior Publication Data

US 2004/0119277 A1 Jun. 24, 2004

(51) Int. Cl.[7] .................................................. B60P 7/08
(52) U.S. Cl. ................................ 410/12; 410/7; 410/8; 410/11; 410/103; 410/104
(58) Field of Search ...................... 410/3–4, 7–12, 410/103–105, 23, 100; 296/65.04; 248/499; 280/304.1

(56) References Cited

U.S. PATENT DOCUMENTS

| | | | | |
|---|---|---|---|---|
| 4,886,403 A | * | 12/1989 | Gresham | 410/10 |
| 4,995,775 A | * | 2/1991 | Gresham | 410/10 |
| 5,026,225 A | * | 6/1991 | McIntyre | 410/23 |
| 5,391,030 A | * | 2/1995 | Lee | 410/12 |
| 5,664,918 A | * | 9/1997 | Heider et al. | 410/103 |
| 5,888,038 A | * | 3/1999 | Ditch et al. | 410/7 |
| D413,080 S | * | 8/1999 | Girardin | D11/215 |
| 6,287,060 B1 | * | 9/2001 | Girardin | 410/7 |
| 6,406,230 B1 | * | 6/2002 | Mason et al. | 410/7 |
| 6,428,254 B2 | * | 8/2002 | Craft | 410/7 |
| 6,471,454 B1 | * | 10/2002 | Koller | 410/7 |
| 6,524,039 B1 | * | 2/2003 | Magnuson et al. | 410/23 |
| 6,698,983 B1 | * | 3/2004 | Kiernan et al. | 410/23 |

* cited by examiner

Primary Examiner—Stephen Gordon
(74) Attorney, Agent, or Firm—Dowell & Dowell, P.C.

(57) ABSTRACT

A wheelchair restraint system which includes a floor mounting track, an anchor slidably mountable in said mounting track, and a seat belt retractor directly swivelly mounted on the anchor for movement in a single plane. In a preferred embodiment the seat belt retractor has a planar lower surface which lies in a substantially horizontal plane which is parallel to the mounting track when in operative position.

2 Claims, 4 Drawing Sheets

LOW PROFILE SEAT BELT RETRACTOR SYSTEM

FIELD OF INVENTION

This invention relates to wheelchair restraint systems, and more particularly to a device to mount a seat belt retractor to a floor track.

BACKGROUND OF INVENTION AND PRIOR ART

Wheelchair restraint systems are, of course, well known and many patents have been granted thereon. Attention is directed to the systems marketed by Giram LLC of Fort Lauderdale, Fla., and to U.S. Design Pat. No. D413,080 issued 24 Aug. 1999 which shows a seat belt retractor of the type contemplated by the present invention, and to U.S. Pat. No. 6,287,060 which issued 11 Sep. 2001 to the present inventor. Such retractors are generally removably mounted on a floor track or fitting, which is permanently mounted on the floor of the bus or van used to convey the wheelchair and occupant, by way of an appropriate connector. Preferably, but not essentially, the retractor is flexibly mounted to the connector so as to allow some pivotal movement of the retractor relative to the track. Typically, in the prior art, this flexibility has been provided by an unsupported ring structure so that the retractor can move in both a vertical and horizontal plane. When not in use the retractor normally lies on the floor of the vehicle where it may collect dust and dirt and may move in a horizontal plane around the tether point, and thus out of reach of the wheelchair occupant. This is a considerable disadvantage which was addressed, in part, by the present inventor in U.S. Pat. No. 6,287,060. Also in the prior art systems, the lap belt anchor point has been provided separately from the seat belt retractor, and it is seen as an advantage to provide a lap belt anchor point integrally with the seat belt retractor. Problems do, however, still remain. In particular, it has been found in practice that the height of the retractor above the track interferes with movement in the vehicle and is somewhat cumbersome and costly to manufacture.

OBJECT OF INVENTION

It is, therefore, an object of the present invention to provide a wheelchair seat belt retractor system which provides pivotal movement of the retractor in a single plane, yet has a low profile while still keeping the retractor away from the floor of the vehicle.

Another object of the invention is to provide a seat belt retractor with an integral lap belt mounting point.

BRIEF DESCRIPTION OF INVENTION

By one aspect of this invention there is provided in a wheelchair restraint system for use in a passenger carrying vehicle, which comprises a longitudinal floor mounting track, anchor means releasably and lockably mountable at a selected position in said mounting track, and a seat belt retractor means mounted on said anchor means, the improvement wherein said retractor means is pivotally mounted directly on said anchor means, for movement in a single plane.

By another aspect of this invention there is provided in a wheelchair restraint system for use in a passenger carrying vehicle, which comprises a floor mounting track, anchor means slidably mountable in said mounting track, a seat belt retractor means pivotally mounted on said anchor means, the improvement wherein said retractor means is mounted directly to said anchor means, for pivotal movement in a single plane, and has, when in operative position, a lower planar surface substantially parallel and spaced from said floor mounting track. In a preferred embodiment a lap belt attachment bracket is coaxially mounted with said seat belt retractor means.

DETAILED DESCRIPTION OF PREFERRED EMBODIMENTS

Figure 1:
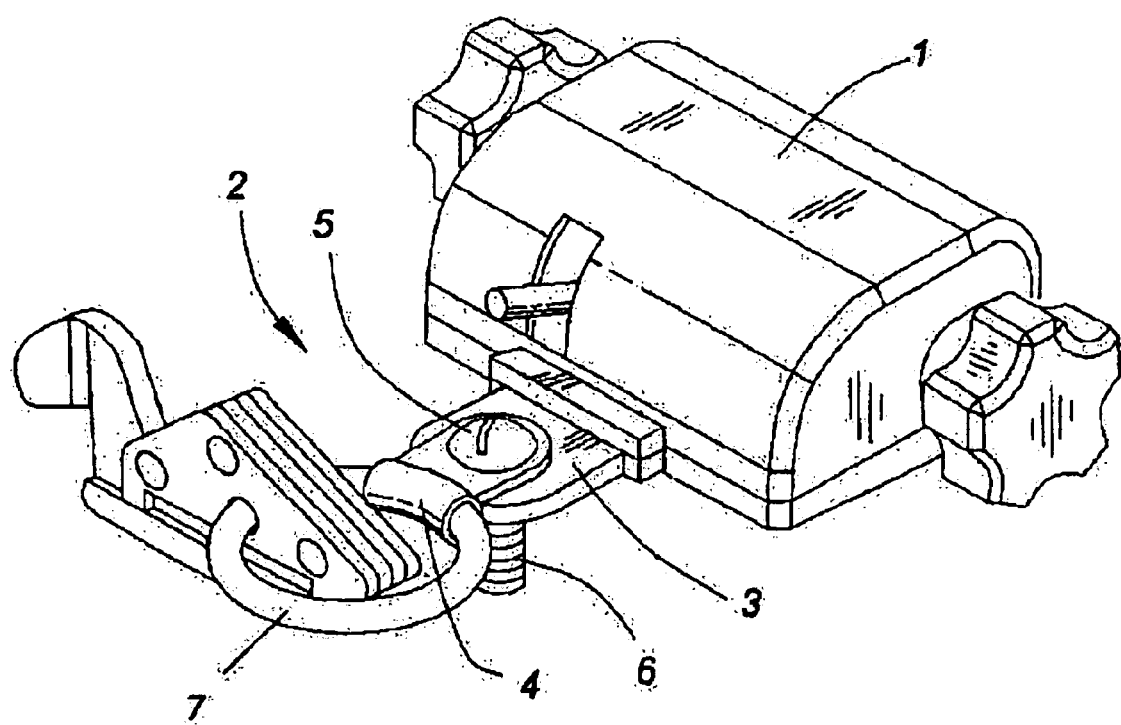
FIG. 1 shows a sketch of a seat belt retractor attachment system according to the prior art.
Figure 2:
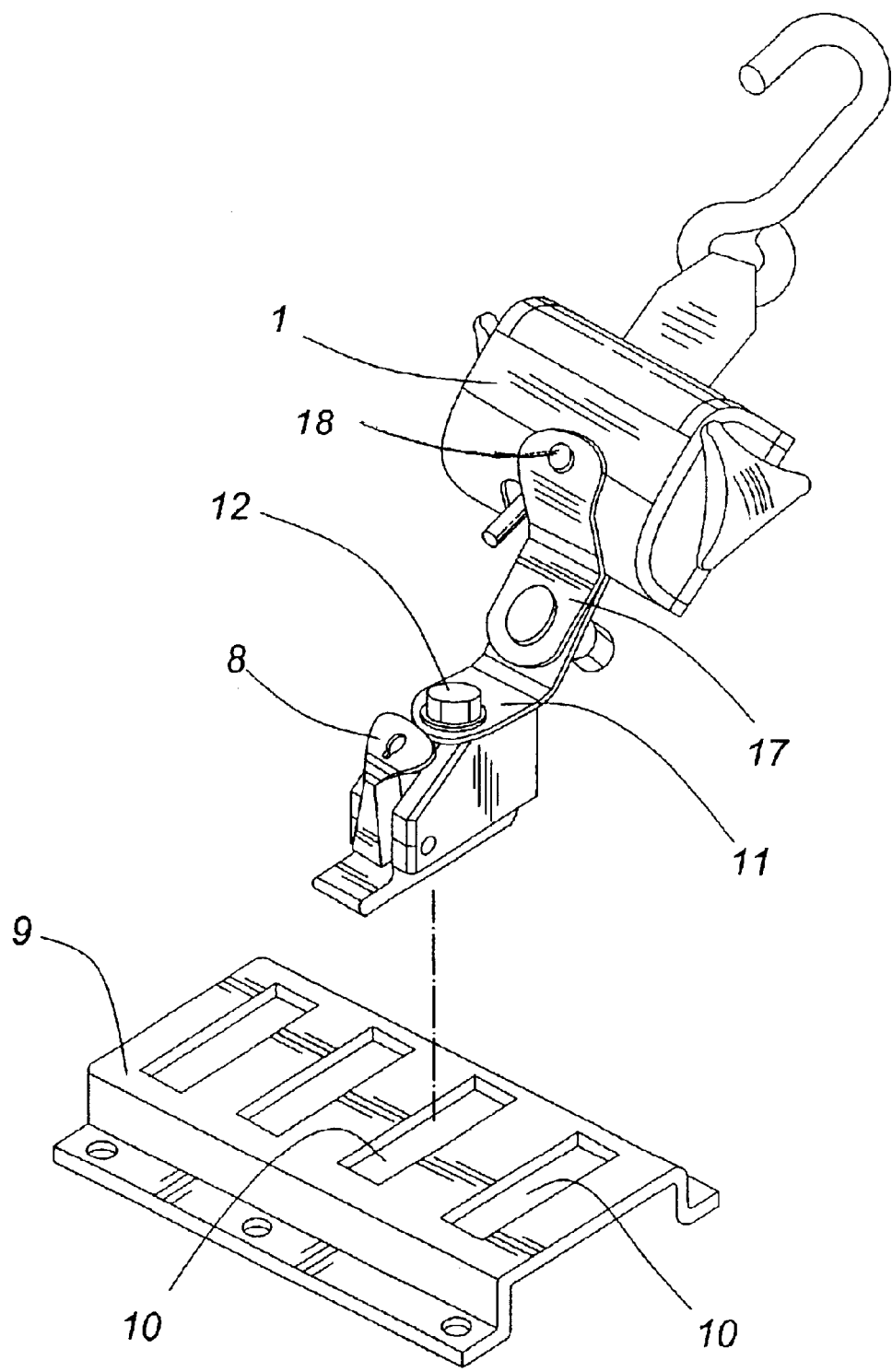
FIG. 2 shows a sketch of a seat belt retractor pivoting attachment system according to U.S. Pat. No. 6,287,060.

In FIG. 1, there is shown a seat belt retractor 1 having a floor attachment means 2 mounted thereon for movement in a vertical or horizontal plane. Means 2 comprises a tongue 3 pivotally interconnected to a U-clip 4 by a blot 5 and nut 6. U-clip 4 is mounted on a ring 7, which in turn is releasably mounted on a floor track fitting 8 (FIG. 2). It will be appreciated that the retractor 1, which is preferably, but not essentially, of the design covered by U.S. Design Pat. No. D413,080, is free to move in both a vertical plane and in a horizontal plane when mounted as shown. In FIG. 2 there is shown a similar retractor 1 swivelly mounted, according to U.S. Pat. No. 6,287,060, for movement in a single plane approximately 45° to the horizontal track 9. Track fitting 8 is adapted so that it can be locked into place in any of the holes 10 in track 9. A 45° angle bracket 11 is swivelly mounted, at the lower end thereof, by a bolt 12, to track fitting 8. The tongue 3 of retractor 1 is secured to the upper end of bracket 11, by a bolt 12. FIG. 2 also shows a lap belt attachment bracket 17 which overlies tongue 3 and is held in place by bolt 12. Bracket 17 is provided with a lap belt receiving pin 18.

Figure 3:
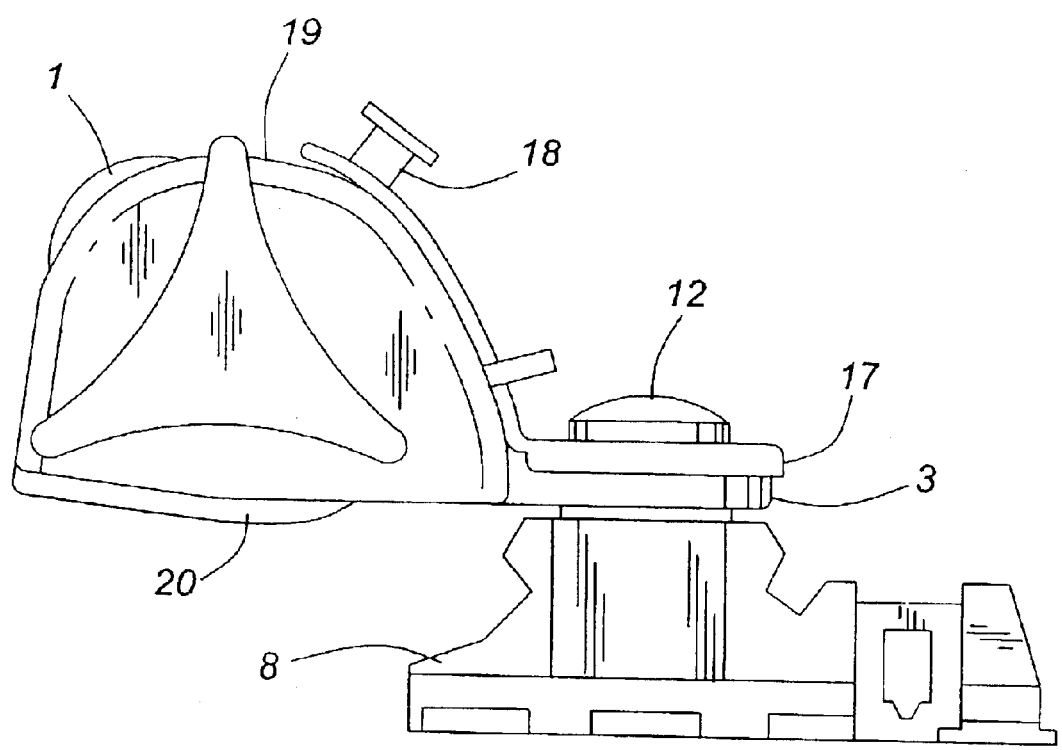
FIG. 3 shows a side view of the seat belt retractor system according to one embodiment of the present invention.
Figure 4:
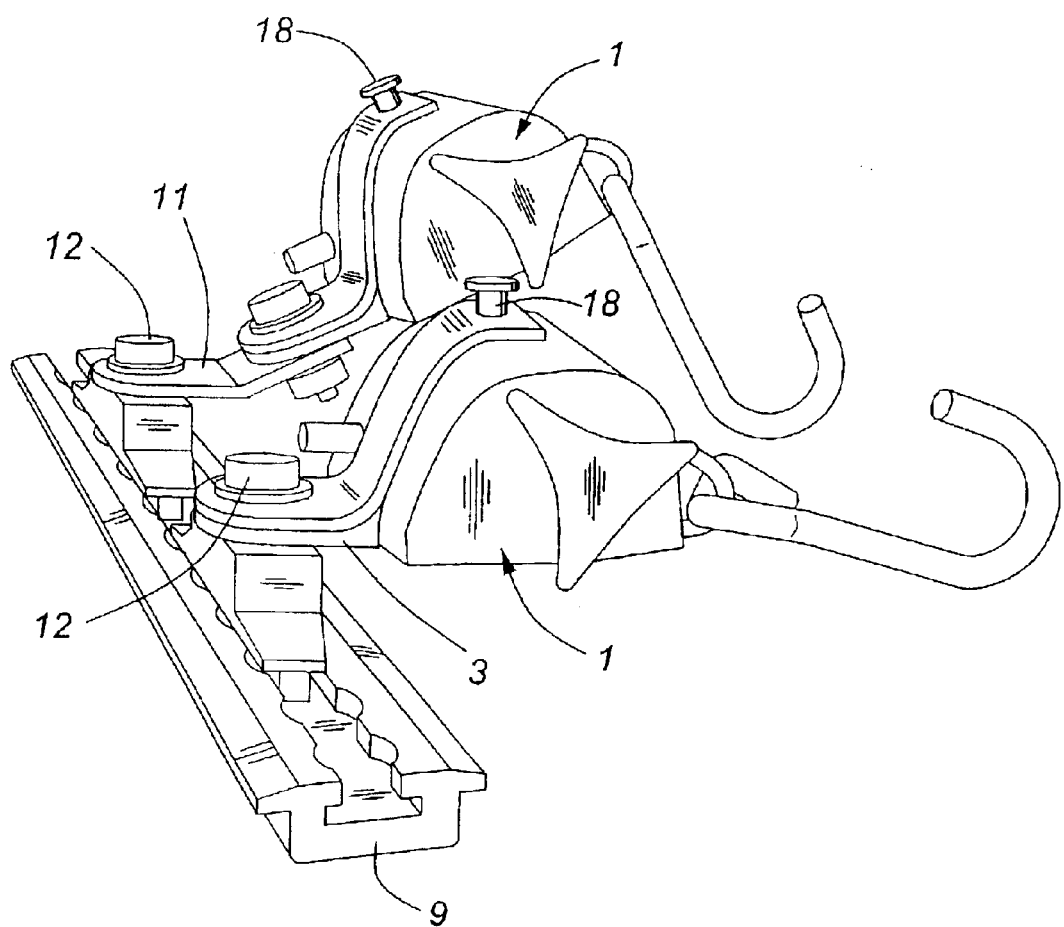
FIG. 4 shows an isometric sketch of the retractor of FIG. 2 on the same floor mounting track as a retractor according to FIG. 3.

As seen in FIGS. 3 and 4, the overall height of the retractor system can be reduced considerably and the overall longitudinal length reduced by omitting 45° bracket 11 entirely and pivotally mounting the tongue 3 of the retractor directly to track fitting 8 by means of bolt 12. Accordingly, the retractor system takes up considerably less space in the vehicle, thereby facilitating use by a larger or wider wheelchair. Lap belt attachment bracket 17 may also be coaxially mounted on bolt 12. As seen most clearly in FIG. 3, the retractor 1 is provided with an upper cylindrical surface 19 and a lower substantially planar surface 20, from which the tongue 3 extends laterally so that surface 20, when the retractor is mounted in operative position on the track 9, preferably lies in a substantially horizontal plane and parallel to the plane of the floor track. It will be appreciated, however, that the tongue 3 may be bent, either upwardly or downwardly, to any desired angle, so that the plane of surface 20 is not parallel to the plane of the track.

I claim:

1. In a wheelchair restraint system for use in a passenger carrying vehicle, which comprises a longitudinal floor mounting track, anchor means releasably mountable at a selected position on said mounting track, and a seat belt retractor means mounted on said anchor means, the improvement wherein said retractor means is pivotally mounted directly on said anchor means, for movement in a single plane, which is substantially horizontal and parallel to said floor mounting track.

2. A restraint system as claimed in claim 1 including a lap belt attachment bracket mounted on said anchor means so as to overlie said retractor means.

* * * * *